United States Patent
Tsuchida et al.

(10) Patent No.: US 9,676,099 B2
(45) Date of Patent: Jun. 13, 2017

(54) CONTROL DEVICE FOR PERFORMING FLEXIBLE CONTROL OF ROBOT

(71) Applicant: FANUC Corporation, Yamanashi (JP)

(72) Inventors: Yukinobu Tsuchida, Yamanashi (JP); Teruki Kuroshita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/693,939

(22) Filed: Apr. 23, 2015

(65) Prior Publication Data

US 2015/0314441 A1 Nov. 5, 2015

(30) Foreign Application Priority Data

Apr. 30, 2014 (JP) .................. 2014-093912

(51) Int. Cl.
*B25J 9/16* (2006.01)
*B25J 13/08* (2006.01)

(52) U.S. Cl.
CPC ............ *B25J 9/1633* (2013.01); *B25J 13/085* (2013.01); *B25J 13/088* (2013.01); *G05B 2219/39346* (2013.01); *G05B 2219/42123* (2013.01)

(58) Field of Classification Search
CPC . B25J 9/1633; B25J 9/16; B25J 9/1674; B25J 13/085; B25J 13/088; G05B 19/19; G05B 2219/42117; G05B 2219/42123; G05B 2219/42352; G05B 2219/39323
See application file for complete search history.

(56) References Cited

U.S. PATENT DOCUMENTS

| | | | |
|---|---|---|---|
| 4,860,215 A | 8/1989 | Seraji | |
| 6,294,890 B1 | 9/2001 | Shimada et al. | |
| 9,278,451 B2* | 3/2016 | Kouno | B25J 9/1676 |
| 2009/0069942 A1* | 3/2009 | Takahashi | B25J 9/1633 |
| | | | 700/260 |
| 2012/0191245 A1* | 7/2012 | Fudaba | B25J 9/1633 |
| | | | 700/254 |

FOREIGN PATENT DOCUMENTS

| | | |
|---|---|---|
| DE | 69636230 T2 | 4/2007 |
| DE | 102009058607 A1 | 6/2011 |
| JP | 5-158514 A | 6/1993 |
| JP | 5-189008 A | 7/1993 |
| JP | 10-151590 A | 6/1998 |
| JP | 10-193290 A | 7/1998 |
| JP | 3283650 B2 | 5/2002 |

(Continued)

*Primary Examiner* — Abby Lin
(74) *Attorney, Agent, or Firm* — Hauptman Ham, LLP

(57) ABSTRACT

A robot control device adapted for performing flexible control includes: an operation state monitoring unit for determining the operation state of the robot on the basis of outputs from a position detecting unit for detecting positions of respective shafts of a robot, a force detecting unit for detecting forces of respective shafts of the robot or a time measuring unit for measuring time; a storage unit for storing a plurality of parameter sets indicating flexibility of the flexible control; and an operation generating unit for switching the parameter sets each indicating flexibility on the basis of an output from the operation state monitoring unit at the time of executing the flexible control.

10 Claims, 8 Drawing Sheets

(56) References Cited

FOREIGN PATENT DOCUMENTS

| | | |
|---|---|---|
| JP | 2004-148466 A | 5/2004 |
| JP | 3681431 B2 | 8/2005 |
| JP | 2007-105823 A | 4/2007 |
| JP | 4051526 B2 | 2/2008 |
| JP | 2010-253676 A | 11/2010 |
| WO | 2011/036750 A1 | 3/2011 |
| WO | 2011/161765 A1 | 12/2011 |

* cited by examiner

FIG. 4A

```
FLEXIBLE CONTROL PARAMETER SET SETUP

PARAMETER SET No. [1]

COORDINATE SYSTEM No. : [178]
              VIRTUAL    VIRTUAL
              SPRING     DAMPER      LIMITER
X-DIRECTION: 0.1[m/kg]  10.0[m/s/kg]  10.0[kg]
Y-DIRECTION: 0.0[m/kg]   0.0[m/s/kg]  99.0[kg]
Z-DIRECTION: 0.1[m/kg]  10.0[m/s/kg]  10.0[kg]
AROUND X   : 0.0[/kgm]   0.0[/s/kgm]  10.0[kgm]
AROUND Y   : 0.0[/kgm]   0.0[/s/kgm]  10.0[kgm]
AROUND Z   : 0.0[/kgm]   0.0[/s/kgm]  10.0[kgm]

[MENU]      [RETURN]     [THRESHOLD VALUE]
```
— 15

FIG. 4B

```
FLEXIBLE CONTROL PARAMETER SET SETUP

PARAMETER SET No. [99]

COORDINATE SYSTEM No. : [UNUSED]
              VIRTUAL    VIRTUAL
              SPRING     DAMPER      LIMITER
AROUND J1: 0.1[/kgm]   9.0[/s/kgm]  10.0[kgm]
AROUND J2: 0.0[/kgm]   0.0[/s/kgm]   9.0[kgm]
AROUND J3: 0.1[/kgm]   9.0[/s/kgm]  10.0[kgm]
AROUND J4: 0.0[/kgm]   0.0[/s/kgm]  10.0[kgm]
AROUND J5: 0.0[/kgm]   0.0[/s/kgm]  10.0[kgm]
AROUND J6: 0.0[/kgm]   0.0[/s/kgm]  10.0[kgm]

[MENU]      [RETURN]     [THRESHOLD VALUE]
```
— 15

FIG. 5

```
FLEXIBLE CONTROL PARAMETER SET SETUP

PARAMETER SET No. [1]

SWITCHING THRESOLD VALUE COORDINATE SYSTEM No. : [3]
              POSITION      VELOCITY       FORCE
X-DIRECTION:  10.0[mm]      99.0[mm/s]     30.0[kgf]
Y-DIRECTION:  INVALID[mm]   INVALID[mm/s]  20.0[kgf]
Z-DIRECTION:  INVALID[mm]   INVALID[mm/s]  20.0[kgf]
AROUND X:     INVALID[rad]  INVALID[rad/s] 10.0[kgm]
AROUND Y:     INVALID[rad]  INVALID[rad/s] 10.0[kgm]
AROUND Z:     INVALID[rad]  INVALID[rad/s] 10.0[kgm]

TIME: 10.0[sec]

[MENU]         [RETURN]         [GAIN]
```

FIG. 6A

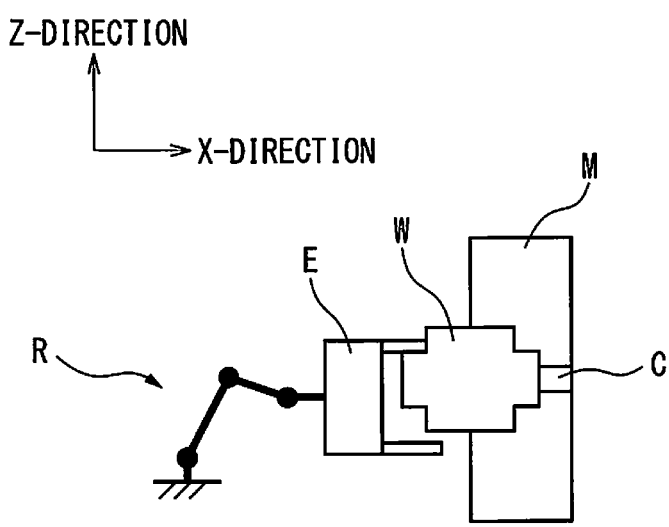

CONTROL DEVICE FOR PERFORMING FLEXIBLE CONTROL OF ROBOT

RELATED APPLICATIONS

The present application claims priority to Japanese Application Number 2014-093912, filed Apr. 30, 2014, the disclosure of which is hereby incorporated by reference herein in its entirety.

BACKGROUND ART OF THE INVENTION

1. Field of the Invention

The present invention relates to a control device adapted for performing flexible control of robot.

2. Description of the Related Art

There is performed a flexible control adapted for realizing flexibility of force exerted between tools of a robot and a workpiece in a direction defined by the tool coordinate system having a predetermined positional attitude relationship with respect to the mechanical interface or the end effector of the robot, or the task coordinate system having a predetermined positional attitude relationship with respect to the robot base coordinate system.

Such a flexible control is disclosed in the Japanese Patent Application Laid Open No. 2010-253676, the Japanese Patent Publication No. 3681431, the Japanese Patent Publication No. 3283650 and the Japanese Patent Application Laid Open No. 5-158514, for example. Further, in the Japanese Patent Application Laid Open No. 2004-148466, it is disclosed that parameter sets are switched at the time of executing the flexible control.

As a main use purpose of a flexible control on the orthogonal coordinate of the robot, die-cast taking-out working may be exemplified. The die-cast taking-out working is a working to hold a workpiece in a metal mold of a die-cast machine by means of an end effector of the robot thereafter to extrude the workpiece from the metal mold by using cylinder, or the like, on the die-cast machine side. In the die-cast taking-out working, the robot operates, in correspondence with the operation and the force, by which the workpiece is extruded, by making use of flexible control on the orthogonal coordinate. In other words, the robot performs "following operation". The Japanese Patent Publication No. 4051526 discloses a flexible control synchronous with such extrusion working.

In the prior art, first a control device capable of storing a plurality of parameter sets indicating flexibility is prepared. Further, as disclosed in the Japanese Patent Application Laid Open No. 2004-148466, the control device switches such parameter sets on the basis of signals from the side where the extruding operation performs. For example, there is prepared a program of robot to wait such a signal output during flexible control based on, e.g., the first parameter set, and to implement switching into the second parameter set on receiving such signal thus to perform the flexible control.

However, in this method, electric delay of signal and physical delay of the extruding operation are independent from each other. For this reason, there is a problem that it is difficult to precisely synchronize the switching work and the extruding work. Further, in this method, the parameter sets cannot be always switched at respective suitable timings. Accordingly, since the direction of the robot is limited also at the time of holding a workpiece, there are cases where variation in the dimension of the workpiece may not be absorbed. In addition, also at the time of extruding the workpiece by means of the cylinder, or the like, there are instances where the robot may follow in all directions so that the robot cannot go straight.

Moreover, when it is difficult to switch parameter sets on the basis of signal, there was prepared a single parameter set capable of complying, to a certain degree, with both the working for holding the workpiece and the extrusion working for extruding the workpiece by means of the end factor. However, in this case, there is a problem that the both performances of the workpiece holding working operation and the workpiece extruding working operation are inferior in comparison to the case where dedicated parameter sets are respectively prepared.

The present invention has been made in view of such circumstances, and has an object to provide a robot control device adapted to securely implement, without using any complicated peripheral equipment, a function to switch setup value in a following direction of the flexible control, i.e., parameter sets of flexibility strictly in synchronism with the extrusion working in order to switch the following direction at a suitable timing.

SUMMARY OF THE INVENTION

To achieve the previously described object, in accordance with the first aspect, there is provided a robot control device adapted for performing a flexible control to realize flexibility of a force exerted between a tool of a robot and a workpiece in a direction defined by the tool coordinate system having a predetermined positional attitude relationship with respect to a mechanical interface or an end effector of the robot or the task coordinate system having a predetermined positional attitude relationship with respect to the robot base coordinate system, which includes: an operation state monitoring unit for determining an operation state of the robot on the basis of outputs from a position detecting unit for detecting positions of the respective shafts of the robot, and a force detecting unit for detecting forces of the respective shafts of the robot or a time measuring unit for measuring time; a storage unit for storing a plurality of parameter sets each indicating flexibility of the flexible control; and an operation generating unit for switching the parameter sets each indicating flexibility on the basis of an output from the operation state monitoring unit at the time of executing the flexible control.

In accordance with the second aspect, there is provided a robot control device adapted for performing a flexible control to realize flexibility in directions defined by respective axial coordinate systems having a predetermined positional attitude relationship with respect to respective joint positions of a robot, which includes: an operation state monitoring unit for determining an operation state of the robot on the basis of outputs from a position detecting unit for detecting positions of respective shafts of the robot, a force detecting unit for detecting forces of the respective shafts of the robot or a time measuring unit for measuring time; a storage unit for storing a plurality of parameter sets each indicating flexibility of the flexible control; and an operation generating unit for switching parameter sets each indicating flexibility on the basis of an output of the operation state monitoring unit at the time of executing the flexible control.

In accordance with the third aspect, in the first aspect, the parameter set indicating flexibility is determined in accordance with a spring constant of a virtual spring in at least one of the translational directions along respective coordinate axes and the rotational directions therearound on the tool coordinate system or the task coordinate system.

In accordance with the fourth aspect, in the first aspect, the parameter set indicating flexibility is determined in accordance with a damper constant of a virtual damper in at least one of the translational directions along respective coordinate axes and rotational directions therearound on the tool coordinate system or the task coordinate system.

In accordance with the fifth aspect, in the first aspect, the parameter set indicating flexibility is an upper limit of the magnitude of a force or a moment in at least one of the translational directions along respective coordinate axes and rotational directions therearound on the tool coordinate system or the task coordinate system.

In accordance with the sixth aspect, in the second aspect, the parameter set indicating flexibility is determined in accordance with a spring constant of a virtual spring in at least one of the translational directions along the respective coordinate axes of respective prismatic-joint shafts and the rotational directions around the coordinate axes of respective rotational-joint shafts.

In accordance with the seventh aspect, in the second aspect, the parameter set indicating flexibility is determined in accordance with a damper constant of a virtual damper in at least one of the translational directions along the coordinate axes of respective the prismatic-joint shafts and the rotational directions around the coordinate axes of the rotational-joint shafts.

In accordance with the eighth aspect, in the second aspect, the parameter set indicating flexibility is an upper limit of the magnitude of a force or a moment in at least one of the translational directions along the coordinate axes of the respective prismatic-joint shafts and the rotational directions around the coordinate axes of the respective rotational-joint shafts.

In accordance with the ninth aspect, in any one of the first to eighth aspects, the operation state monitoring unit determines the operation state of the robot on the basis of a difference between a position or a velocity at a certain past time point and a current position or a current velocity.

In accordance with the tenth aspect, in any one of the first to ninth aspects, the operation state monitoring unit determines the operation state of the robot on the basis of an elapsed time from a predetermined past time point.

In accordance with the eleventh aspect, in any one of the first to eighth embodiments, an output of the operation state monitoring unit determines the operation state of the robot on the basis of a difference between a force at a certain past time point and a current force.

These objects, features and merits, and other objects, features and merits of the present invention will become more apparent from the detailed description of typical embodiments of the present invention illustrated in the accompanying drawings.

BRIEF DESCRIPTION OF THE DRAWINGS

FIG. 4A is a view illustrating one example of parameter set input screen.

FIG. 4B is a view similar to FIG. 4A illustrating another example of the parameter set input screen.

FIG. 5 is a view illustrating a switching condition setup screen.

FIG. 6A is a first diagram illustrating the working in which a robot grasps workpiece by using flexible control.

DETAILED DESCRIPTION OF THE INVENTION

Figure 1:
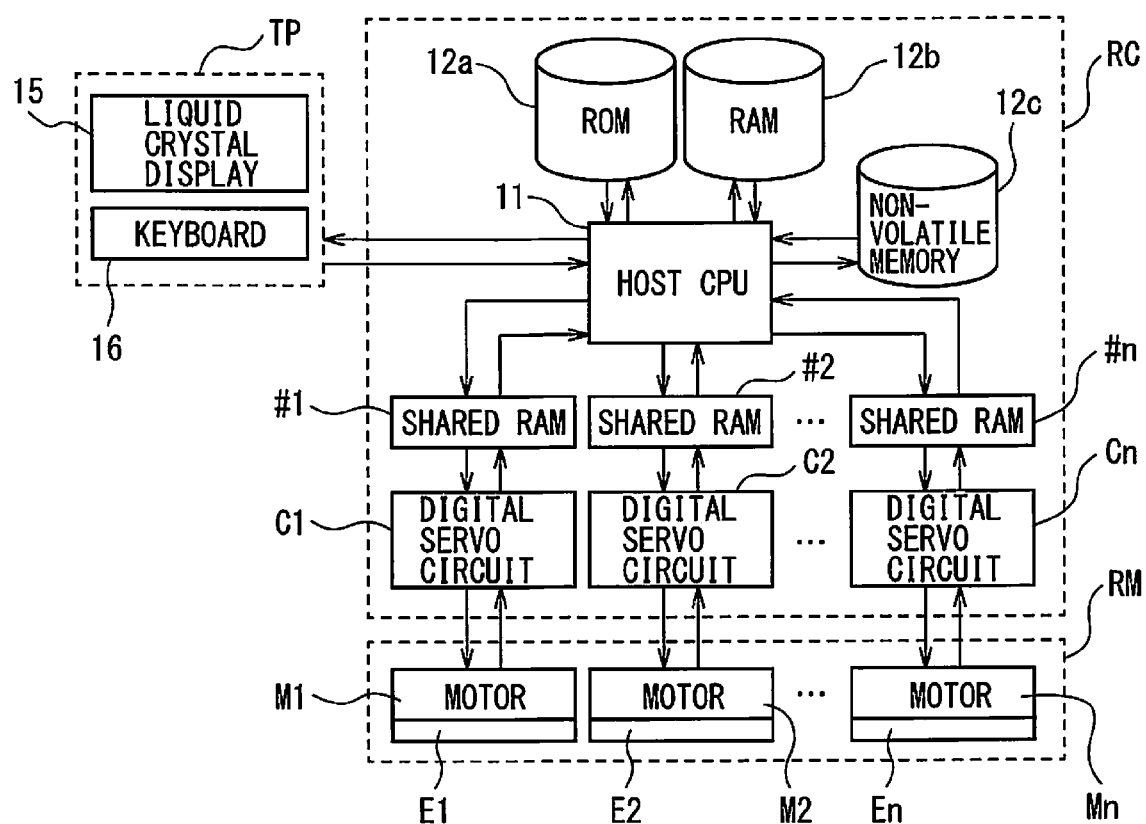
FIG. 1 is a functional block diagram of a robot control device based on the present invention.

Preferred embodiments of the present invention will now be described with reference to the attached drawings. In the following drawings, similar reference numerals are respectively attached to similar members in the following drawings. For the purpose of facilitating understanding, scales are changed in these drawings as occasion demands.

FIG. 1 is a functional block diagram of a robot control device based on the present invention. As illustrated in FIG. 1, the robot control device RC is connected to a teaching console panel TP, and a robot R, strictly speaking, a robot mechanism unit RM of the robot R.

As illustrated in FIG. 1, the robot control device RC includes a host CPU 11 for controlling the entirety of the robot control device RC. Moreover, the robot control device RC includes a ROM 12a in which various kinds of system programs are stored, a RAM 12b used when the host CPU 11 temporarily stores the data, and a non-volatile memory 12c in which various kinds of programs relating to content of the operation of the robot, related setup values, and the like are stored.

As illustrated in FIG. 1, a plurality of shared RAMs #1 to #n are connected to the host CPU 11, and digital servo circuits C1 to Cn are connected to these shared RAMs #1 to #n. These plural shared RAMs #1 to #n serve to transfer movement commands or control signals output from the host CPU 11 to respective processors of the digital servo circuits C1 to Cn, and to transfer various kinds of signals from processors of these digital servo circuits C1 to Cn to the host CPU 11. Accordingly, although not illustrated in the drawings, it is assumed that the digital servo circuits C1 to Cn respectively include processors, ROMs, RAMs, and the like.

Moreover, the number of the shared RAMs #1 to #n and the number of the digital servo circuits C1 to Cn correspond to the number of motors M1 to Mn of the robot mechanism unit RM of the robot. These motors M1 to Mn are used for driving respective joint shafts of the robot. Further, these respective motors M1 to Mn are provided with encoders E1 to En for detecting positions of the respective shafts of the robot R. A typical vertical multi-joint type robot of the hexaxial configuration includes six-joint shafts J1 to J6. Accordingly, the numbers of the motors, the shared RAMs, the digital servo circuits and the encoders are respectively set to six.

As illustrated in FIG. 1, the teaching console panel TP includes a liquid crystal display 15, and a keyboard 16.

These devices are used for performing inputs and changes of data in the previously described program and inputs and changes of related setup values.

Figure 2:
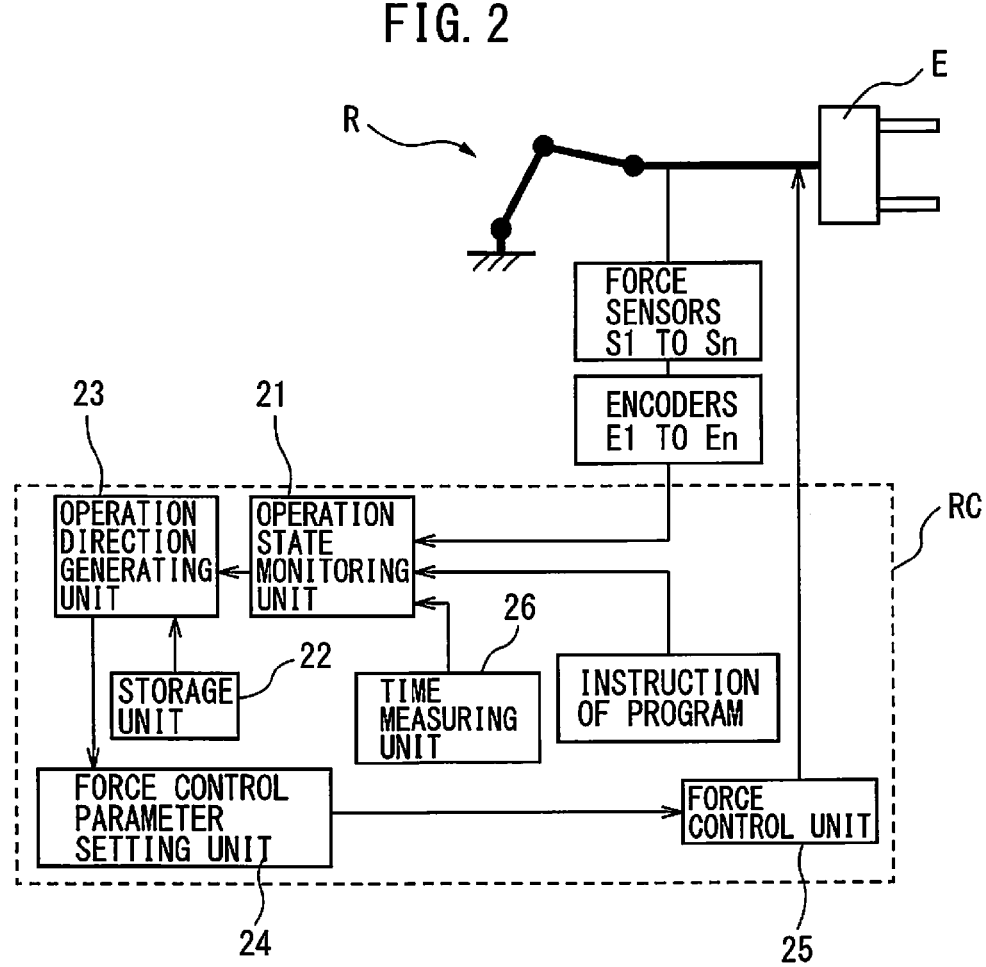
FIG. 2 is a diagram illustrating the fundamental configuration of the robot control device in the present invention.

FIG. 2 is a diagram illustrating the fundamental configuration of the robot control device in the present invention. As illustrated in FIG. 2, the robot R includes, at the front end thereof, an end effector E, e.g., a grasping part. Moreover, force sensors S1 to Sn illustrated in FIG. 2 are assumed to detect forces exerted to the respective shafts of the robot. The robot control device RC as a digital computer includes an operation state monitoring unit 21 adapted for determining the operation state of the robot on the basis of outputs from encoders E1 to En, force sensors S1 to Sn or a time measuring unit 26 which measures time. The time measuring unit 26 mainly measures an elapsed time after flexible control is started.

Further, the robot control device RC includes a storage unit 22 for storing a plurality of parameter sets indicating the flexibility of flexible control. In the storage unit 22, there are stored parameter sets for realizing flexible control corresponding to different working operations or different control characteristics. It is assumed that these parameter sets are determined in advance by experiment, or the like, and are stored in advance by a user.

Further, the robot control device RC includes an operation generating unit 23 for selecting a suitable parameter sets on the basis of an output from the operation state monitoring unit 21 during flexible control. Moreover, as understood from FIG. 2, it is assumed that instructions of programs are also input to the operation state monitoring generating unit 21 as occasion demands. For this reason, there are instances where the switching work by the operation generating unit 23 may be performed through the operation state monitoring unit 21 in accordance with the content of the program that the robot control device RC executes.

Further, a force control parameter setup unit 24 performs switching into a parameter set selected by the operation generating unit 23. Next, the force control unit 25 controls the robot R so as to realize flexible control in accordance with the parameter set thus switched. It is to be noted that there are instances where, during executing the flexible control, the operation generating unit 23 may switch parameter sets on the basis of an output from the operation state monitoring unit 21 or the like.

Figure 3:
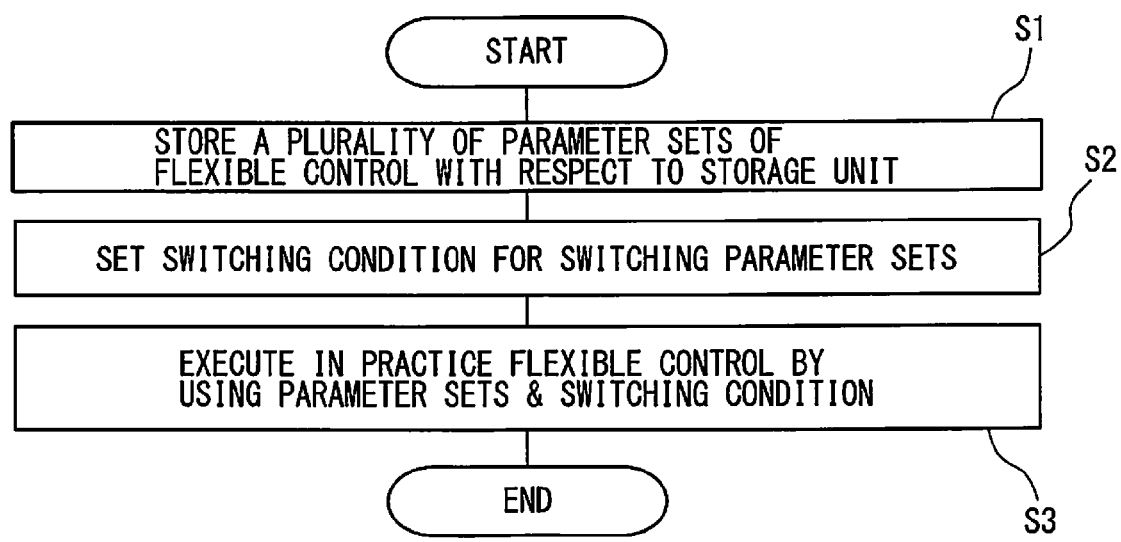
FIG. 3 is a flowchart illustrating usage of the robot control device based on the present invention.

FIG. 3 is a flowchart illustrating usage of the robot control device based on the present invention. As illustrated in FIG. 3, in step S1, a user makes the storage unit 22 store a plurality of parameter sets for flexible control to be stored. Next, in step S2, the user sets a switching condition for switching the parameter sets. Thereafter, in step S3, the robot control device RC makes the robot execute the flexible control in practice by using the previously described parameter sets and the switching condition.

In the present invention, if the switching condition for switching the parameter sets is fulfilled when the robot R executes the flexible control using a certain parameter set, the operation generating unit 23 or the force control parameter setting unit 24 switches a parameter set into another parameter set to execute the flexible control.

These steps S1 to S3 will now be described in detail by taking an example.

First, FIG. 4A is a view illustrating one example of parameter set input screen in regard to the step S1. This input screen is assumed to be displayed on the liquid crystal display 15 of the teaching console panel TP. The respective parameter sets are numbered, and the example illustrated in FIG. 4A is the first parameter set.

The orthogonal coordinate system in which the flexible control is performed is set at the column of "coordinate system No." in FIG. 4A. Such a coordinate system is, e.g., the tool coordinate system having a predetermined positional attitude relationship with respect to the mechanical interface or the end effector E of the robot, or the task coordinate system having a predetermined positional attitude relationship with respect to the robot base coordinate system. In FIG. 4A, the content of the coordinate system No. 178 is illustrated as an example.

Further, respective descriptions for the X-direction, the Y-direction and the Z-direction respectively indicate setup values of flexibility in the X-direction, in the Y-direction and in the Z-direction in the coordinate system No. 178. It is to be noted that the column for specifying the positional relationship between the orthogonal coordinate system in which the flexible control is performed and the robot base coordinate system may be separately provided. In this case, use of the coordinate system numbers may be avoided.

The "virtual spring" in FIG. 4A indicates a proportional constant (spring constant) when a linear relationship is supposed between a force to move, from the outside, in each direction, the end effector E of the robot R in the flexible control and the movement distance thereof. The user sets the column of the "virtual spring" by using the keyboard 16 of the teaching console panel TP. It is to be noted that "compliance" which is an inverse number of the spring constant may be set in place of the "virtual spring".

The "virtual damper" in FIG. 4A indicates a proportional constant (damper constant) when a linear relationship is supposed between a force to move, from the outside, the end effector E of the robot R in the flexible control and the moving velocity thereof. The user sets the column of the "virtual damper" by using the keyboard 16 of the teaching console panel TP.

The "limiter" in FIG. 4A indicates a predetermined force at the time of performing a control of the type such that when a force is applied to the end effector E of the robot R in the flexible control, the robot pushes back by an added force until a certain value, while when a force more than or equal to a predetermined threshold value is applied thereto, the robot pushes back by the predetermined force. In other words, the "limiter" is an upper limit of the magnitude of force or moment added to the robot R or the end effector E. The user sets the column of the "limiter" by using the keyboard 16 of the teaching console panel TP.

Flexible control may be performed in the respective prismatic-joint shaft direction and around the respective rotational prismatic-joint shafts of the robot R. In this case, an input screen as illustrated in FIG. 4B which is a drawing similar to FIG. 4A that illustrates another example of the parameter set input screen is displayed on the liquid crystal display 15 of the teaching console panel TP. In regard to the flexible control in the respective prismatic-joint shaft directions and around the respective rotational prismatic-joint shafts of the robot R, the coordinate system for performing control is determined by the positional attitude relationship with respect to respective joint positions of the robot, and it is unnecessary to set the orthogonal coordinate system. For this reason, in FIG. 4B, "unused" is indicated in the column of "coordinate system No." in FIG. 4B. In this case, there is realized flexibility in directions defined by the respective axial coordinate systems which have a predetermined position attitude relationship with respect to the respective joint positions of the robot R.

The user makes a determination so as to use at least one of the columns of "virtual spring", "virtual damper" and "limiter" in accordance with the working content using the flexible control. In the following description, it is assumed that the user uses only "virtual spring" for the purpose of simplicity.

Next, FIG. 5 is a diagram illustrating switching condition setup screen in regard to the step S2 of FIG. 3. It is assumed that this setup screen is displayed on the liquid crystal display 15 of the teaching console panel TP.

At the column of the "position" in FIG. 5, the setup is such that the operation state monitoring unit 21 provides an output to prompt parameter set switching when a difference between a position of each axis at a certain past time point, e.g., at a time of start of the flexible control and a current position exceeds a certain value. Similarly, at the column of "velocity", the setup is such that the operation state monitoring unit 21 provides an output to prompt parameter set switching when a difference between a velocity of each axis at a certain past time point, e.g., a flexible control start time and a velocity at a current time exceeds a certain value. The velocity is determined on the basis of a plurality of successive positions detected by the encoders E1 to En and detection intervals of encoders E1 to En.

By the above description, when the end effector E is pushed from the outside so that the robot starts to move, it is possible to switch the parameter sets. In other words, in the present invention, there are provided advantageous effects to automatically discriminate the time point when a stationary robot begins to move by a force from the outside.

Further, at the column of "time" in FIG. 5, the setup is such that the operation state monitoring unit 21 provides an output to prompt parameter set switching when an elapsed time from a certain past time point, e.g., flexible control start time exceeds a certain amount of time. When a user inputs unnatural value into the "position" column and the "velocity" column by erroneous input, start of the operation of the robot may not be detected and the parameter sets may not be switched. Even in such a case, the column of the "time" is set in a manner as previously described, thereby making it possible to switch the parameter sets.

Further, at the column of the "force" in FIG. 5, the setup is such that the operation state monitoring unit 21 provides an output to prompt the parameter set switching when a difference between a force which has been added to the end effector E of the robot R and a current force added to the end effector E exceeds a certain value. This force is detected by means of the force sensors S1 to Sn. By this fact, when the robot R collides with the peripheral equipment or the like, it is possible to switch those parameter sets.

Input results illustrated in FIGS. 4A and, 4B and 5 are stored into the storage unit 22 of the robot control device RC. In FIGS. 4A and 5, the first parameter set is illustrated, and the second and subsequent parameter sets are similarly set. In the present invention, the switching condition for switching into what number of parameter sets is specified within the operation program. This will be described later.

Figure 6B:
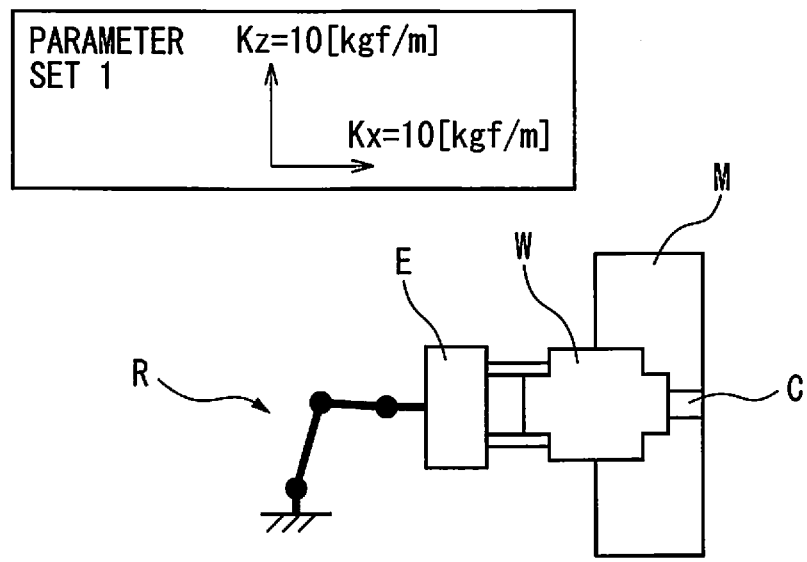
FIG. 6B is a second diagram illustrating the working in which a robot grasps workpiece by using flexible control.
Figure 6C:
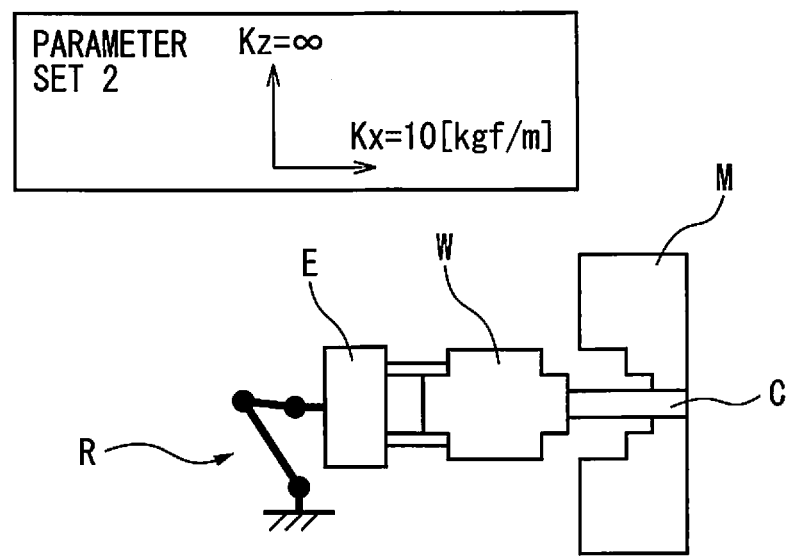
FIG. 6C is a third diagram illustrating the working in which the robot grasps workpiece by using flexible control.

Next, in regard to the step S3 of FIG. 3, the robot R is made to execute the flexible control in practice by using the parameter sets and the switching condition as previously described. FIGS. 6A to 6C are diagrams illustrating the working that the robot R grasps the workpiece by using the flexible control. In FIG. 6A or the like, the workpiece W is formed within the metal mold M. Moreover, a cylinder C for extruding the workpiece W is disposed at a penetration hole formed in advance within the metal mold M. In FIG. 6B, the end effector E of the robot R grasps one side of the workpiece W. Further, as illustrated in FIG. 6C, at the same time as the other side of the workpiece W is pressed by means of the cylinder C to extrude the workpiece W from the metal mold M, the end effector E of the robot R pulls out the workpiece W from the metal mold M.

Execution programs in which statements for executing the flexible control are described are prepared in advance in the robot control device RC. Further, by fetching an execution program, the flexible control is performed.

Figure 7A:
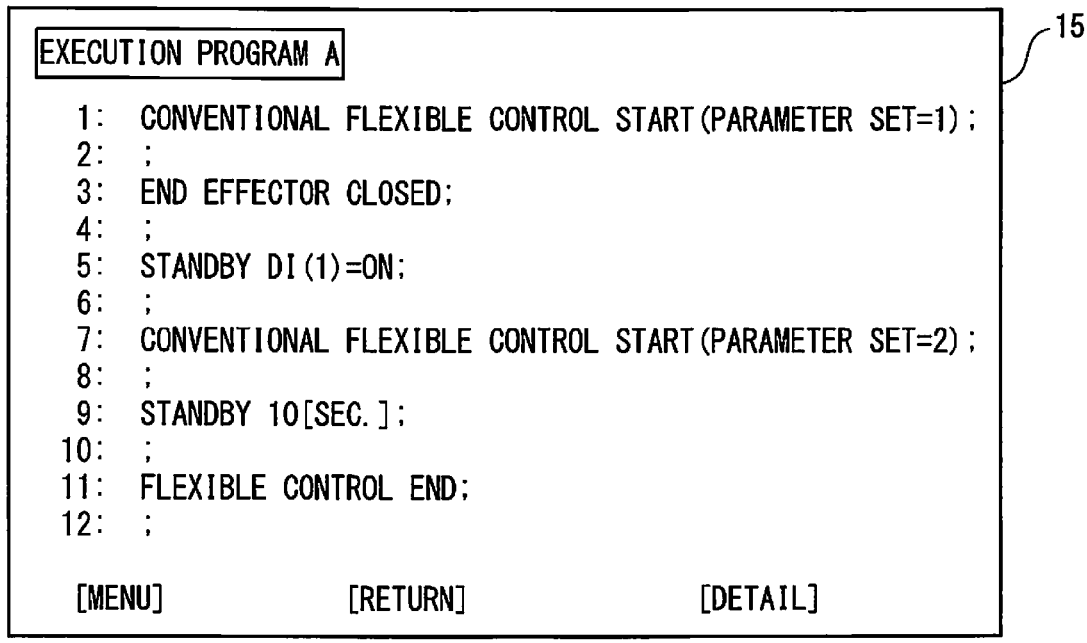
FIG. 7A is a view illustrating an example of execution program in the prior art.
Figure 7B:
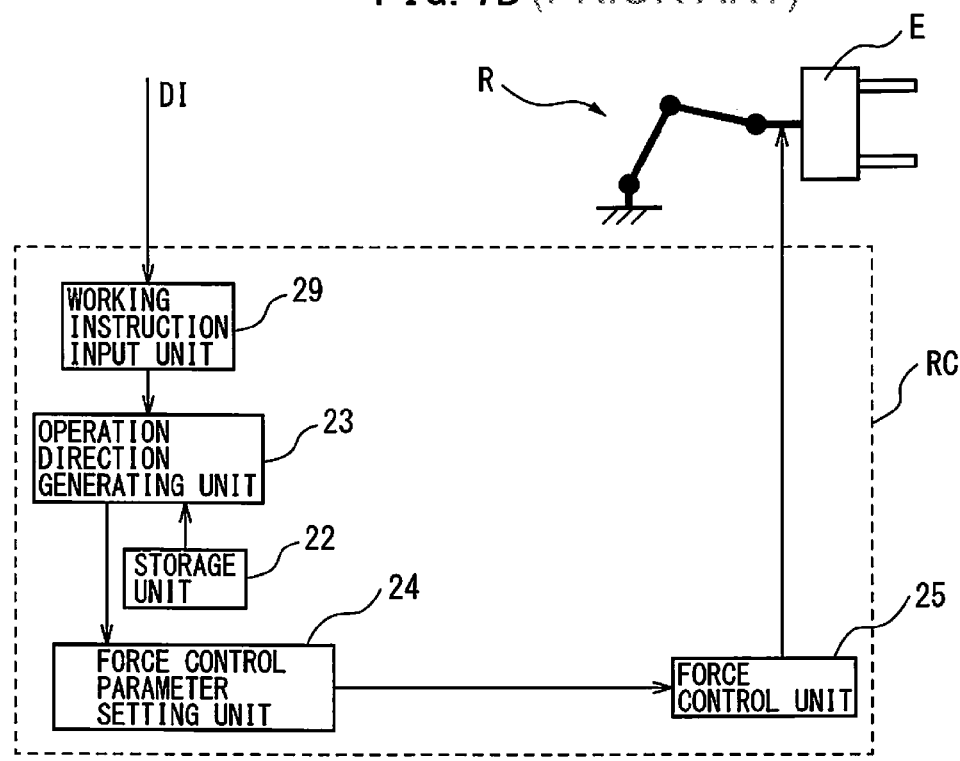
FIG. 7B is a diagram illustrating the fundamental configuration of a robot control device in the prior art.

FIG. 7A is a diagram illustrating the example of the execution program in the prior art, and this execution program is assumed to be displayed on the liquid crystal display 15 of the teaching console panel TP. Moreover, FIG. 7B is a diagram illustrating the fundamental configuration of the robot control device in the prior art. In FIG. 7B, the operation state monitoring unit 21 is excluded, and a working instruction input unit 29 is illustrated within the robot control device RC.

On the first line of the execution program A of the prior art illustrated in FIG. 7A, the flexible control is started by the first parameter set. Next, the end effector E is closed on the third line. Moreover, on the fifth line, the cylinder C stands by until an extrusion start signal D1 (1) to extrude the workpiece W is turned ON. On the seventh line, after the working instruction input unit 29 receives the extrusion start signal D1, the flexible control is started by the second parameter set. Thereafter, on the ninth line, standby operation continues for ten seconds. This time is a time required when the workpiece W is extruded out from the metal mold M, and is changed, as occasion demands, depending upon dimensions of the workpiece W and the metal mold M. Finally, the flexible control is completed on the eleventh line.

Figure 8:
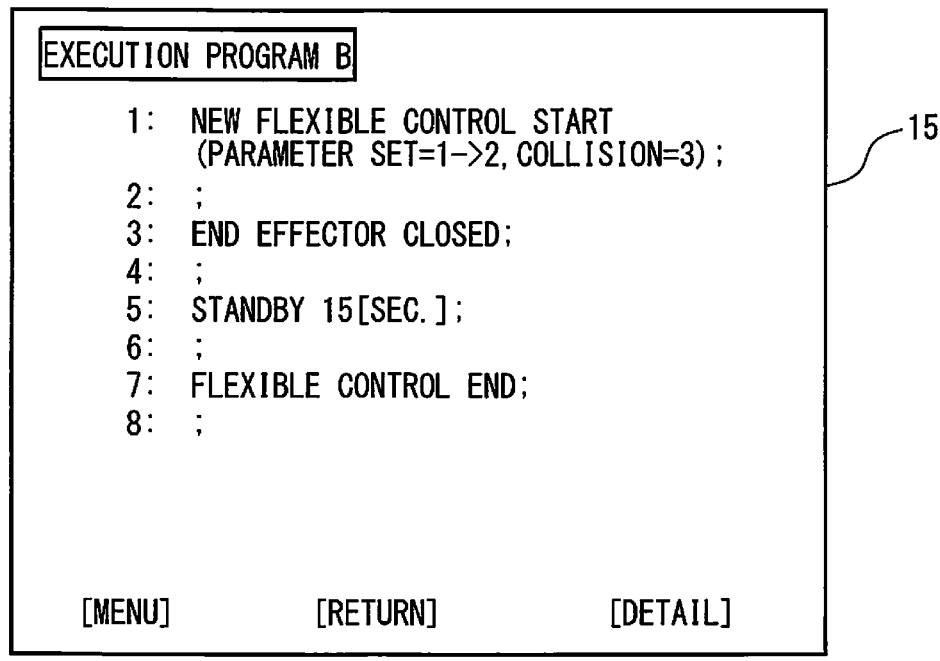
FIG. 8 is a view illustrating an example of execution program in the present invention.

Further, FIG. 8 is a diagram illustrating an example of the execution program in the present invention. This execution program is assumed to be displayed on the liquid crystal display 15 of the teaching console panel TP. On the first line of the execution program B illustrated in FIG. 8, "new flexible control start (parameter set =1 –>2, collision =3" is described. This means that the flexible control is started by the first parameter set, and when positions or velocities of respective shafts of the robot exceed respective threshold values, the flexible control is performed by switching into the second parameter set, and when forces added to the respective shafts or forces added to the end effector E of the robot exceed the above threshold values, flexible control is performed by switching into the third parameter set.

Further, the end effector E is closed on the third line. Further, on the fifth line, standby operation continues for 15 seconds. This time is a total time of a time required until the cylinder C starts extrusion and a time required when the workpiece W is extruded from the metal mold M. This time is also changed in accordance with dimensions of the workpiece W and the metal mold M as occasion demands. Finally, the flexible control is completed on the seventh line.

The advantageous effects of the present invention as described above will now be described.

First, the robot R grasps the workpiece W by means of the end effector E attached to the mechanical interface of the front end thereof while performing the flexible control. Since dimensions of the workpiece W varies every time, it is preferable to absorb the variation by controlling the robot R to follow the workpiece in all directions so that the workpiece w and the end effector E are not damaged in grasping the workpiece W. At the first parameter set applied for the first time, such flexibility is set. For example, 10 [kgf/m] is set for spring constant in the X-direction and spring constant in the Z-direction to perform the flexible control. In this case, if the end effector E is closed by a force of 0.1 [kgf], it is possible to absorb a positional shift of 0.01 [m] or less on the XZ plane (see FIG. 6B).

Further, it is desirable to switch the parameter sets of the flexible control at a suitable timing synchronous with extrusion of the workpiece W by the cylinder C. As previously described, in the prior art, the side to extrude the workpiece W transmits extrusion start signal D1. Further, until the robot control device RC receives the extrusion start signal D1, it stands by at "standby D1 (1)=1" on the fifth line of the execution program A. Namely, it is retained to switch the parameter sets. However, in accordance with this system, there is the problem that since electric delay of the extrusion start signal D1 and the physical delay of the extrusion action of the cylinder C are independent of each other, precise synchronization cannot be guaranteed.

On the contrary, in the present invention, when respective shafts are moved in the X-direction by 10 [mm] at the time of execution of the flexible control by the first parameter set, switching into the second parameter set is performed. The fact that the parameter set after switching is the second parameter set is described on the first line of the execution program B illustrated in FIG. 8. Moreover, the criteria that "respective shafts are moved by 10 [mm] in the X-direction" is set at the column of "X-direction" on the input screen of FIG. 5. It is to be noted that since flexibility movable in all directions is set at the first parameter set before switching, movement can be performed by 10 [mm] in the X-direction.

Thus, the parameter set switching work of the robot control device RC is synchronized with extrusion action of the workpiece W by the cylinder C. Since such a switching working operation can be actualized only by processing within the robot control device RC, it is unnecessary to use any complicated peripheral equipment.

Next, the robot R carries the workpiece W which has been extruded from the metal mold M while holding it. In this instance, when the attitude of the end effector E is changed, moment is added to the end effector E. Further, there is the problem that when the end effector E is moved in a direction perpendicular to the extrusion direction (Z-direction in this embodiment), the end effector E suffers from stress from the metal mold M.

For this reason, it is preferable that the robot R follows the workpiece only in an orthogonal direction, i.e., a direction parallel to the extrusion direction (X-direction in this embodiment) which is restricted so that no load is added to the workpiece W or the end effector E. Such flexibility is set at the second parameter set after switching. For example, the flexible control is performed under the condition where the spring constant in the X-direction is 10 [kgf/m] and the spring constant in the Z-direction is ∞ (see FIG. 6C). In this case, when the cylinder C extrudes the end effector E by a force of which component in the X-direction is 3 [kgf], the robot R may be extruded only in the X-axis direction by the distance of 0.3 [m].

Figure 9:
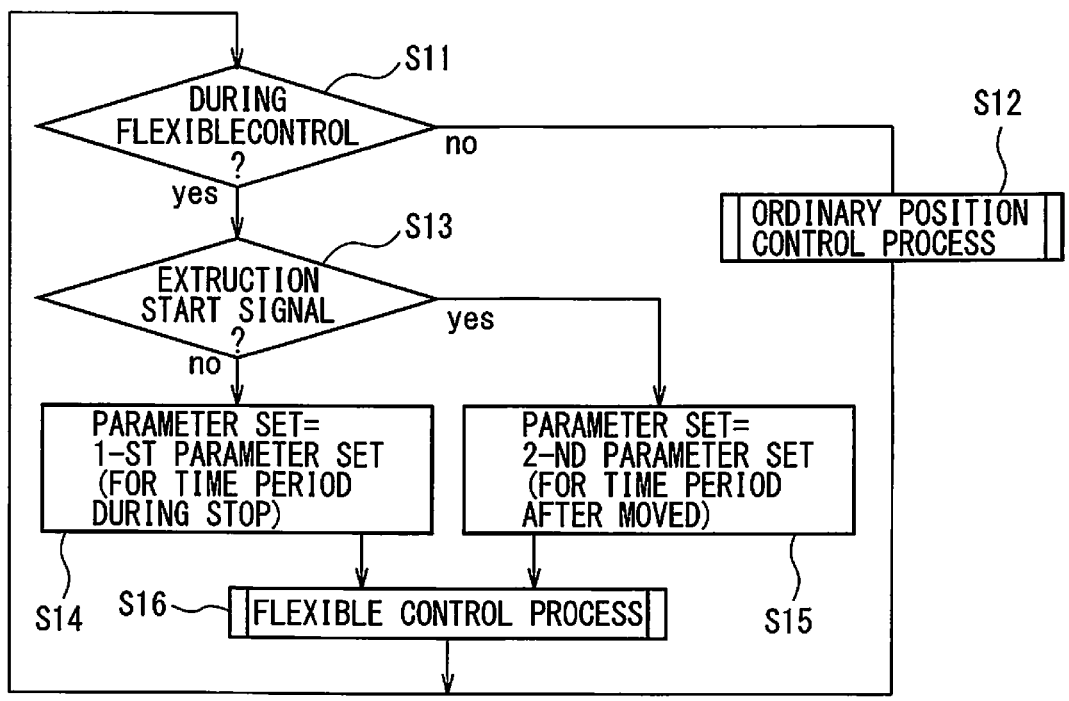
FIG. 9 is a flowchart illustrating processing that the robot control device implements every predetermined time period during running of the execution program A in the prior art.
Figure 10:
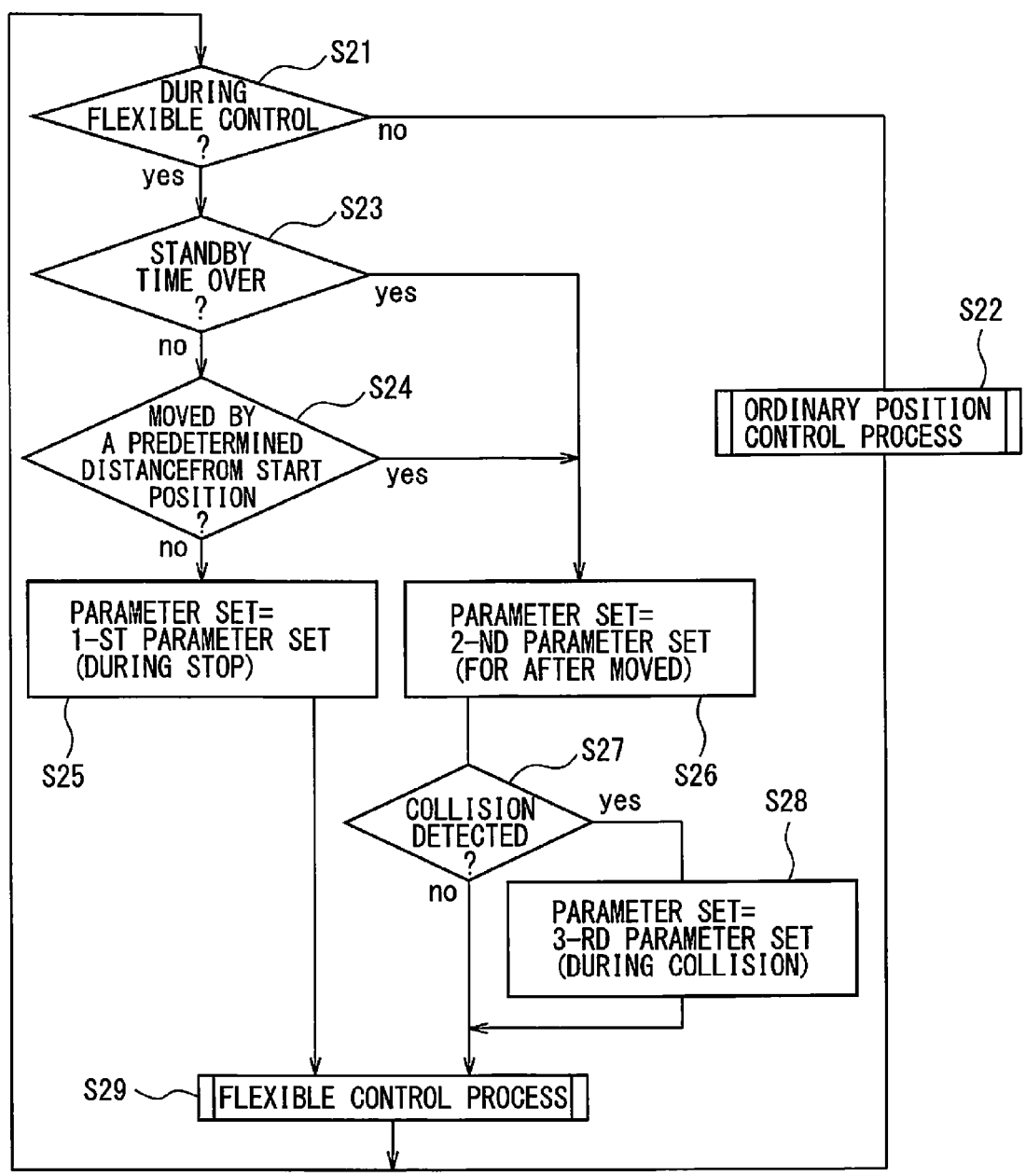
FIG. 10 is a flowchart illustrating processing that the robot control device implements during running of the execution program B in the present invention.

During such working, the host CPU 11 within the robot control device RC implements a specific processing every predetermined period. FIG. 9 is a flowchart illustrating, for the comparison, the processing that the robot control device performs every predetermined time period during running of the execution program A in the prior art. Further, FIG. 10 is a flowchart illustrating the processing that the robot control device RC implements every predetermined time period during running of the execution program B in the present invention.

First, the processing of the prior art will be described with reference to FIG. 9. It is assumed that processes illustrated in FIGS. 9 and 10 are implemented repeatedly every predetermined control period. In the prior art, first, in step S11, whether or not the flexible control is being performed is determined. When the flexible control is not being performed, process step proceeds to step S12 to perform ordinary position control. When the current state is after execution of "flexible control start" on the first line of the execution program A and before "flexible control end" execution on the eleventh line, it is determined that the flexible control being performed.

Further, when the flexible control is being performed, it is determined in step S13 whether or not the extrusion start signal D1 is output. Further, when the extrusion start signal D1 is not output, the first parameter set is used as is to perform the flexible control (steps S14, S16). When the extrusion start signal D1 has been output, switching from the first parameter set into the second parameter set is performed in step S15 to perform flexible control (steps S15, S16).

Then, the processing of the present invention will now be described with reference to FIG. 10. First, in step S21, whether or not the flexible control is being performed is determined. When the flexible control is not being performed, the process step proceeds to step S22 to execute ordinary position control process. The determination of whether or not the flexible control is being performed is similar to the case of the previously described execution program A.

Further, in step S23, whether or not the standby time, e.g., 10 seconds, which has been described with reference to FIG. 5 has passed is determined through the time measuring unit 26. When the standby time has passed, the process step proceeds to step S26 to implement switching from the first parameter set into the second parameter set to perform the flexible control. When the standby time has not passed, the process step proceeds to step S24. The second parameter set is previously described, and flexibility is set so as to make the robot R follow only a direction parallel to the extrusion direction.

In step S24, whether or not respective shafts of the robot are moved by a predetermined distance or more from the start position of the flexible control is determined. When movement is not performed by a predetermined distance or more, the first parameter set is used as is to perform the flexible control (steps S25, S29). When movement is performed by a predetermined distance or more, switching from the first parameter set into the second parameter set is implemented to perform the flexible control (step S26).

When switching into the second parameter set has been performed, it is determined in step S27 whether or not a force added to the end effector E exceeds a threshold value, i.e., whether or not the end effector E collides with the peripheral equipment or the like. When it is determined that collision has been made, switching from the second parameter set into the third parameter set is implemented to perform the flexible control (steps S28, S29). This fact is described on the first line of the execution program B illustrated in FIG. 8. In the third parameter set, the flexible control which is flexible, e.g., with respect to all directions is set.

Accordingly, when the robot 1 collides with the peripheral equipment or the like, it is possible to switch parameter sets.

For this reason, when the robot R collides with the peripheral equipment or the like, after switching into the following operation in a limited direction is implemented, switching into the following operation in all directions can be again implemented to thereby prevent the robot R from breakage.

As can be seen from comparison between the execution program B of the present invention and the execution program A of the prior art, the execution program B can perform a more complicated control although the execution program B is simpler than the execution program A. In addition, in the present invention, the extrusion start signal D1 is not required, and the parameter sets are switched on the basis of an output from the operation state monitoring unit 21. For this reason, in the present invention, it is possible to switch the following direction of the robot R in synchronism with extrusion on the basis of only information within the robot control device RC without using any complicated peripheral equipment.

Moreover, since the parameter sets are switched on the basis of an output from the operation state monitoring unit 21, it is possible to perform switching working operations at respective suitable timings. For this reason, the present invention can avoid the case where dimensional variation of the workpiece fails to be absorbed and the case where the robot does not go straight as described in the column of the prior art.

Advantageous Effects of the Invention

In the first and second aspects, since the parameter sets are switched on the basis of an output from the operation state monitoring unit, so as to perform a flexible control, it is possible to switch the following direction of the robot strictly in synchronism with the extrusion working operation on the basis of only information within the control device without using any complicated peripheral equipment. Moreover, since the parameter sets are switched on the basis of an output from the operation state monitoring unit, it is possible to perform switching working operations at respective suitable timings. For this reason, the case where the dimensional variation of the workpiece fails to be absorbed and the case where the robot does not go straight can be avoided.

In the third to eight aspects, it is possible to select any suitable parameter set in accordance with the working content or the like of the robot.

In the ninth aspect, there is an advantageous effect to automatically determine the time point when a robot at a stop began to move by a force from the outside.

In the tenth aspect, even when the user erroneously inputs the position and the velocity relating to the start of the flexible control and switching operation in the following direction, it is possible to switch parameter sets.

In the eleventh aspect, when the robot collides with the peripheral equipment or the like, it is possible to switch parameter sets. For this reason, when the robot collides with any peripheral equipment or the like after switching is performed into the following operation in a limited direction is implemented, switching into following operation in all directions is again performed, thereby making it possible to prevent the robot from breakage.

While the present invention has been described by using typical embodiments, it will be understood that persons skilled in the art may implement the previously described changes, and various other changes, and omissions, and/or supplements without departing from the scope of the present invention.

What is claimed is:

1. A robot control device for performing a flexible control to realize flexibility of a force exerted between a tool of a robot and a workpiece in a direction defined by a tool coordinate system having a predetermined positional attitude relationship with respect to a mechanical interface or an end effector of the robot, or a task coordinate system having a predetermined positional attitude relationship with respect to a robot base coordinate system, the robot control device comprising:
    a position sensor configured to detect a position of a respective shaft of the robot;
    a processor configured to determine an operation state of the robot on the basis of output from
        the position sensor for detecting the position of the respective shaft of the robot, or
        a timer that measures time; and
    a storage storing a plurality of parameter sets all of which indicate flexibility of the flexible control, said plurality of parameter sets corresponding to a plurality of flexible control modes,
    wherein, in executing the flexible control in accordance with each parameter set among the plurality of parameter sets, the processor is configured to control the robot to move to follow movement of the workpiece in at least one direction to an extent defined by said each parameter set, said movement of the workpiece being caused by a device other than the robot, and
    wherein the processor is configured to switch among the plurality of parameter sets on the basis of the determined operation state of the robot during executing the flexible control.

2. The robot control device according to claim 1, wherein the processor is configured to determine, among the plurality of parameter sets, a parameter set for executing the flexible control in accordance with a spring constant of a virtual spring in at least one of a translational direction along a respective coordinate axis and a rotational direction therearound on the tool coordinate system or the task coordinate system.

3. The robot control device according to claim 1, wherein the processor is configured to determine, among the plurality of parameter sets, a parameter set for executing the flexible control in accordance with a damper constant of a virtual damper in at least one of a translational direction along a respective coordinate axis and a rotational direction therearound on the tool coordinate system or the task coordinate system.

4. The robot control device according to claim 1, wherein a parameter set among the plurality of parameter sets includes an upper limit of a magnitude of a force or a moment in at least one of a translational direction along a respective coordinate axis and a rotational direction therearound on the tool coordinate system or the task coordinate system.

5. The robot control device according to claim 1, wherein the processor is configured to determine the operation state of the robot on the basis of a difference between (i) the position or a velocity at a certain past time point and (ii) the current position or a current velocity.

6. The robot control device according to claim 1, wherein the processor is configured to determine the operation state of the robot on the basis of an elapsed time from a predetermined past time point.

7. A robot control device for performing a flexible control to realize flexibility in a direction defined by a respective axial coordinate system having a predetermined positional attitude relationship with respect to respective joint positions of a robot, the robot control device comprising:

a position sensor configured to detect a position of a respective shaft of the robot;

a force sensor configured to detect a force of the respective shaft of the robot;

a processor configured to determine an operation state of the robot on the basis of output from the position sensor for detecting the position of the respective shaft of the robot, or the force sensor for detecting the force of the respective shaft of the robot, or a timer that measures time;

a storage storing a plurality of parameter sets all of which indicate flexibility of the flexible control, said plurality of parameter sets corresponding to a plurality of flexible control modes, wherein, in executing the flexible control in accordance with each parameter set among the plurality of parameter sets, the processor is configured to control the robot to move to follow movement of a workpiece to an extent defined by said each parameter set, said movement of the workpiece being caused by a device other than the robot, and wherein the processor is configured to switch among the plurality of parameter sets on the basis of the determined operation state of the robot during executing the flexible control.

8. The robot control device according to claim 7,
wherein the processor is configured to determine, among the plurality of parameter sets, a parameter set for executing the flexible control in accordance with a spring constant of a virtual spring in at least one of a translational direction along a respective coordinate axis and a rotational direction therearound.

9. The robot control device according to claim 7,
wherein the processor is configured to determine, among the plurality of parameter sets, a parameter set for executing the flexible control in accordance with a damper constant of a virtual damper in at least one of a translational direction along a respective coordinate axis and a rotational direction therearound.

10. The robot control device according to claim 7,
wherein a parameter set among the plurality of parameter sets includes an upper limit of a magnitude of a force or a moment in at least one of a translational direction along a respective coordinate axis and a rotational direction therearound.

* * * * *